US008755576B2

(12) United States Patent
Taerum (10) Patent No.: US 8,755,576 B2
(45) Date of Patent: Jun. 17, 2014

(54) DETERMINING CONTOURS OF A VESSEL USING AN ACTIVE CONTOURING MODEL

(75) Inventor: Torin Arni Taerum, Calgary (CA)

(73) Assignee: Calgary Scientific Inc. (CA)

( * ) Notice: Subject to any disclaimer, the term of this patent is extended or adjusted under 35 U.S.C. 154(b) by 210 days.

(21) Appl. No.: 13/466,407

(22) Filed: May 8, 2012

(65) Prior Publication Data

US 2013/0064435 A1    Mar. 14, 2013

Related U.S. Application Data

(60) Provisional application No. 61/532,700, filed on Sep. 9, 2011, provisional application No. 61/561,582, filed on Nov. 18, 2011, provisional application No. 61/535,034, filed on Sep. 15, 2011, provisional application No. 61/561,569, filed on Nov. 18, 2011, provisional application No. 61/539,429, filed on Sep. 26, 2011, provisional application No. 61/556,496, filed on Nov. 7, 2011, provisional application No. 61/561,576, filed on Nov. 18, 2011.

(51) Int. Cl.
*G06K 9/00* (2006.01)
*A61B 5/05* (2006.01)

(52) U.S. Cl.
USPC ........................... 382/128; 382/274; 600/407

(58) Field of Classification Search
CPC ............... G06K 9/00; A61B 5/05; G06T 7/00
USPC ......... 382/100, 103, 106–107, 128–134, 154, 382/162, 168, 173, 181, 194, 199, 232, 254, 382/274, 203, 276, 286, 291, 305, 312; 600/407; 703/11; 378/4, 21, 28
See application file for complete search history.

(56) References Cited

U.S. PATENT DOCUMENTS

| | | | |
|---|---|---|---|
| 6,782,284 B1 * | 8/2004 | Subramanyan et al. | 600/407 |
| 7,369,691 B2 * | 5/2008 | Kondo et al. | 382/128 |
| 2003/0053697 A1 * | 3/2003 | Aylward et al. | 382/203 |
| 2007/0274579 A1 * | 11/2007 | Cai et al. | 382/131 |
| 2008/0249755 A1 * | 10/2008 | Tek et al. | 703/11 |

FOREIGN PATENT DOCUMENTS

| | | |
|---|---|---|
| WO | 2005/055496 | 6/2005 |
| WO | 2010/068481 | 6/2010 |

OTHER PUBLICATIONS

Aylward, Stephen R., "Initialization, Noise, Singularities, and Scale in Height Ridge Traversal for Tubular Object Centerline Extraction," IEEE Transactions on Medical Imaging, vol. 21, No. 2, Feb. 2002, pp. 61-75.

* cited by examiner

*Primary Examiner* — Seyed Azarian
(74) *Attorney, Agent, or Firm* — Meunier Carlin & Curfman, LLC (57) ABSTRACT

Systems and methods for determine a centerline of a tubular structure from volumetric data of vessels where a contrast agent was injected into the blood stream to enhance the imagery for centerline. An active contour model may be applied to determine contours of the vessel defined within image data by normalizing the image data about a starting point. A snake may be initialized a first time, where the snake defines a set of points that represent a spline within the vessel. Image forces that act on the snake to pull the snake toward a contour of the vessel may be calculated and iteratively applied in a minimization process to determine the contour of the vessel. Optionally, a Gaussian smoothing operation may be performed.

18 Claims, 11 Drawing Sheets

DETERMINING CONTOURS OF A VESSEL USING AN ACTIVE CONTOURING MODEL

CROSS-REFERENCE TO RELATED APPLICATIONS

This application claims priority to U.S. Provisional Patent Application No. 61/532,700, filed Sep. 9, 2011 and U.S. Provisional Patent Application No. 61/561,582, filed Nov. 18, 2011, each entitled "Image Display of a Centerline of Tubular Structure." This application also claims priority to U.S. Provisional Patent Application No. 61/535,034, filed Sep. 15, 2011 and U.S. Provisional Patent Application No. 61/561, 569, filed Nov. 18, 2011, each entitled "Method of Determining Contours of a Vessel Using an Active Contouring Model." This application also claims priority to U.S. Provisional Patent Application No. 61/539,429, filed Sep. 26, 2011; U.S. Provisional Patent Application No. 61/556,496, filed Nov. 7, 2011; and U.S. Provisional Patent Application No. 61/561, 576, filed Nov. 18, 2011, each entitled "Active Vessel Contouring Tool Using Gaussian Smoothing Operation." Each of the above applications is incorporated herein by reference.

BACKGROUND

With the advent of sophisticated medical imaging modalities, such as magnetic resonance, computed tomography, ultrasound, and cone-beam X-ray imaging, three-dimensional (3D) volumetric data sets can be reconstructed from a series of two-dimensional (2D) X-ray slices of an anatomical structure taken around an axis of rotation. Such 3D volumetric data may be displayed using volume rendering techniques so as to allow a physician to view any point inside the anatomical structure, without the need to insert an instrument inside the patient's body.

To detect, diagnose, and treat blood vessel pathologies, physicians and other healthcare professionals rely on the visual examination of 3D images and multiple 2D projection or cross sectional images. Recent advances in the medical image processing field have made available some software tools for semi-automated quantification of vascular diseases. Software tools for semi-automated quantification of the severity of blood vessel stenosis, and the size of aneurysms are available for use today on some clinical image processing workstations. These tools typically analyze blood vessels through an idealized model of a blood vessel, such as a tubular model with possible branching. One of general steps for analyzing the shape of blood vessels is the extraction of the centerline of these vessels. For diseases like aneurysms or stenosis, the profile of the blood vessel diameter along the centerline abnormally expands or shrinks, respectively.

SUMMARY

Disclosed herein are systems and methods for determining a centerline and contours of a tubular structure. The systems may include a computing device and the methods may be performed by a processor executing within the computing device. An active contour model may be applied to determine contours of the tubular structure, such as a vessel, defined within image data by normalizing the image data about a starting point. A snake may be initialized a first time, where the snake defines a set of points that represent a spline within the vessel. Image forces that act on the snake to pull the snake toward a contour of the vessel may be calculated and iteratively applied in a minimization process to transform the snake in order to determine the contour of the vessel. Optionally, a Gaussian smoothing operation may be performed.

In accordance with some implementations, there is provided a method for applying an active contour model to a vessel analysis. The method may include receiving, at a computing device, image data representative of an image of at least one vessel; normalizing the image data about a starting point; initializing a snake a first time, the snake defining a set of points that represent a spline within the vessel; calculating image forces that act on the snake to pull the snake toward a contour of the vessel; and iteratively applying a minimization process to determine the contour of the vessel.

In accordance with some implementations, the method for applying an active contour model to a vessel analysis may include receiving, at a computing device, image data representative of an image of at least one vessel initializing a snake a first time, the snake defining a set of points that represent a spline within the vessel; calculating image forces that act on the snake to pull the snake toward a contour of the vessel, the image forces being determined from magnitudes of first and second derivatives of image intensities at points in the image; iteratively applying a minimization process to determine the contour of the vessel; and applying a Gaussian smoothing operation using the contour from the iteratively applying the minimization process.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for determining a centerline of a tubular vessel, defecting branches and contouring of a tubular vessel, and for determining a location of an aneurysm, it will become evident to those skilled in the art that the implementations are not limited thereto.

Figure 1:
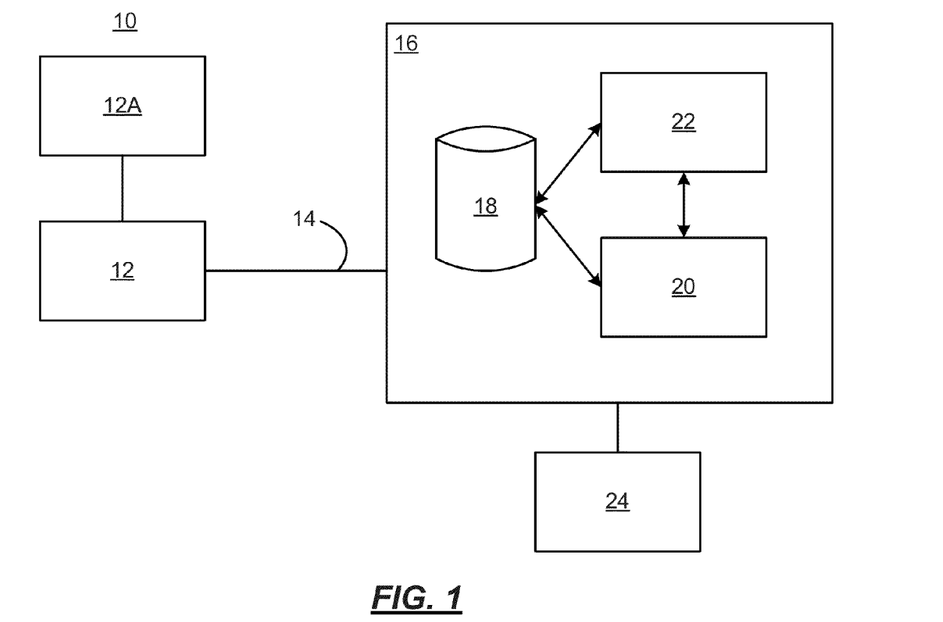
FIG. 1 is a simplified block diagram of a medical imaging system.

FIG. 1 is a simplified block diagram of a medical imaging system 10. The system 10 comprises a medical imaging scanner 12 that acquires image data of a patient under examination. The scanner 12 may use any appropriate imaging modality to acquire the image data, for example, magnetic resonance, computed tomography, ultrasound, and X-ray imaging. The scanner 12 may acquire raw image data from multiple scanned views of the region of interest of the patient, reconstruct the images, and produce image data signals for the multiple views. The image data signals may be in Digital Imaging and Communications in Medicine (DICOM) format. Other formats may also be used.

The imaging scanner 12 is operably connected to a computer system 12a that controls the operation of the scanner 12 and, via a communication channel 14, to an image processing system 16 that processes the image data signals utilizing appropriate image processing software applications. The communication channel 14 may be a direct peer-to-peer connection; a network connection such as LAN, a WAN, or the Internet; a wired or wireless connection, etc. The image processing system 16 has an image data archive or database 18, an application server 20, and a user workstation 22. The components of the image processing system 16 are interconnected via a communications network that may be implemented by physical connections, wireless communications, or a combination. The image data archive or database 18 is adapted to store the image data signals that are produced by the image scanner 12 as well as the results of any additional operations on the image data signals by the other components of the image processing system 16. The image data archive or database 18 may be a Picture Archiving and Communications System (PACS). Other types of image data archives or databases may also be used.

The user workstation 22 is adapted to control the operation of the imaging processing system 16 and its various components. The user workstation 22 may interact with the application server 20 and the various image processing software applications that are stored in, or are accessible by, the application server 20. The user workstation 22 may be any computing device, such as a desktop computer, dedicated workstation, laptop, notebook, table computing device, mobile device (e.g., wireless handheld smartphone), etc. The user workstation 22 communicates via either a wired or wireless connection.

The application server 20 also manages and coordinates the image data sets among the image processing applications. The image processing applications may include, for example, visualization applications, computer-aided diagnosis (CAD) applications, medical image rendering applications, anatomical segmentation applications, or any other type of medical image processing application. The image processing applications may also include the methods of the present invention. The image data archive or database 18, applications server 20, and the user workstation may also each be connected to a remote computer network or computing device 24 (e.g., a remote device having the characteristics of the workstation 22, as noted above) for communication purposes or to access additional data or functionality. The workstation 22 may comprise appropriate user interfaces, like displays, storage media, input/output devices, etc.

The various components of the imaging system 10 are conventional and well known components, and may be configured and interconnected in various ways as necessary or as desired. The imaging system 10 and, in particular, the image processing system 16 is adapted to permit the imaging system 10 to operate and to implement methods in accordance with the present disclosure, for example, as shown in FIG. 3.

Figure 2:
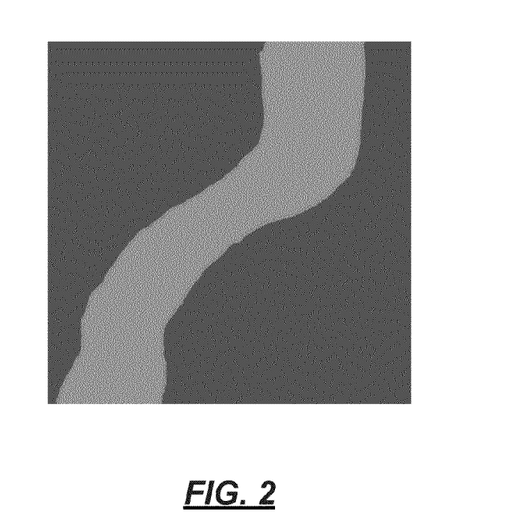
FIG. 2 is an image of a tubular structure.

FIG. 2 illustrates an image of a tubular structure. As shown in FIG. 2, the tubular structure may be a 2D view of a vessel within the body, such as obtained by magnetic resonance (MR) or computed tomography (CT) imaging. The structure may be processed by the image processing system 16 such that it has different pixel intensities, as compared to the surrounding tissue. The image may be presented to a user on a high resolution display of, e.g., the workstation 20, or provided remotely to a device via an application server connected to the image processing system 16 that communicates imagery via a network connection to the remote device.

Figure 3:
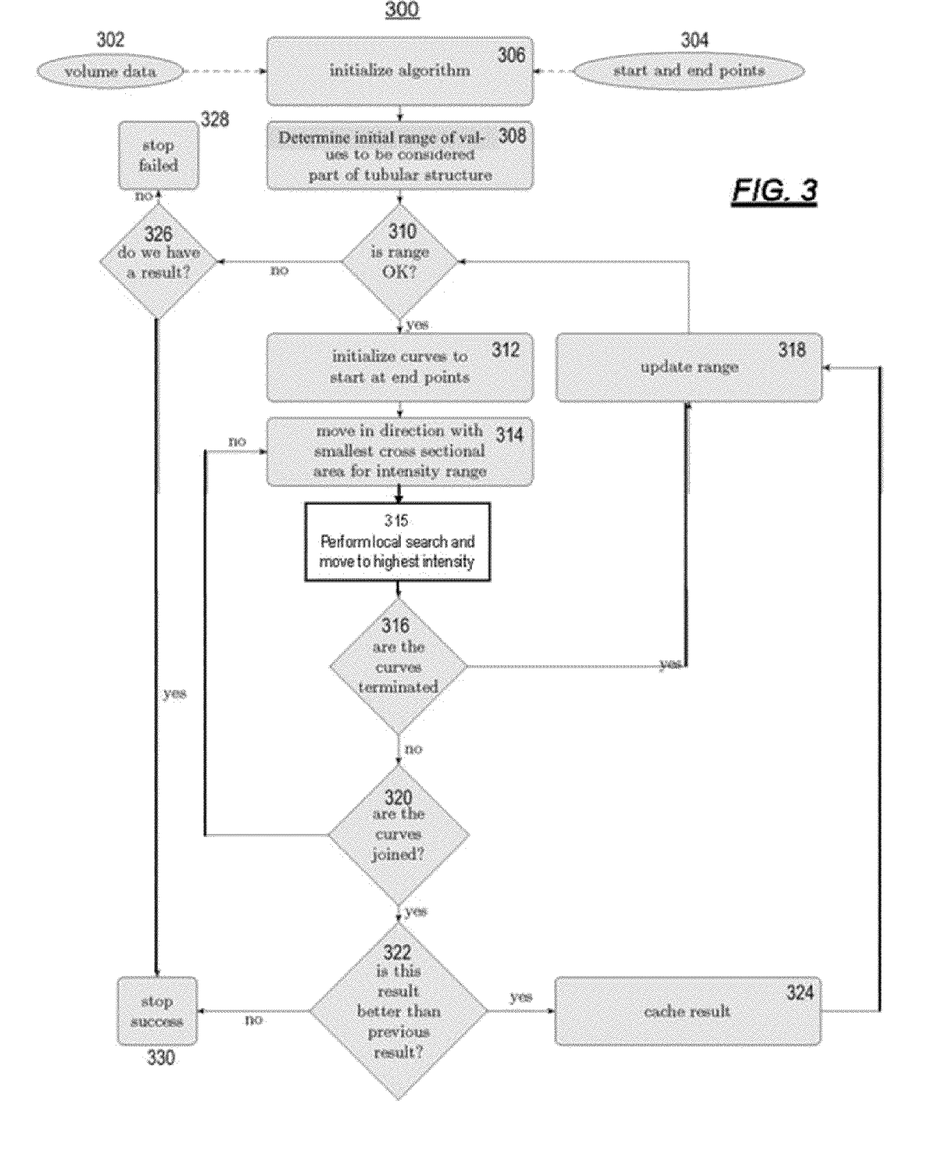
FIG. 3 illustrates an operational flow diagram of processes performed to determine a centerline of a tubular structure, such as that shown in FIG. 2.

FIG. 3 illustrates an operational flow diagram of processes performed to determine a centerline of a tubular structure, such as that shown in FIG. 2. In general, the processes of FIG. 3 identify the centerline and cross sectional contours of tubular structures that may be found in volumetric data, such as that shown in FIG. 2. The volumetric data may be derived from magnetic resonance or computed tomography imagery of vessels where a contrast agent was injected into the blood stream to enhance the imagery for centerlining. Given a 3D array of scalar values and a first and a second point (seed points), the processes will find a path from the first point to the second point that lies in the center of a tubular structure. The first point and the second point may be any points along the tubular structure. The border of the tubular structure is defined by a large gradient magnitude in the scalar intensities. However, the definition of the tubular structure is not always perfect in that the intensity values that make up the inside of the tubular structure may not be known which can make finding the centerline difficult.

The operational flow begins when a 3D array of scalar values (i.e., the volume data) (S302) is provided and two input points, or seed points, within the volume (vessel) are selected as a first point and a second point (S304). The scalar values provided at S302 are pixel intensity values. A user may be presented with a 2D display of the 3D array, where the 2D display is slice along the axial, sagittal or coronal planes (three orthogonal views). From the 2D display, the user may indicate the two input points at S304 when viewing the imagery using, e.g., a mouse, in some implementations, the two input points may be provided automatically by another system.

At S306, the algorithm is initialized by evaluating statistics focal to the two input points. In particular, at S308, at the first point and the second point, the area of the tubular structure at that point and the associated range of data values are determined by detecting the steep gradient at the wall of the tubular structure. For example, the cross-section area may be measured for increasing values of data range. The correct cross-sectional area and associated range is selected by locating the range of values that provides an appropriate minimum in the expansion of the area with changes in the range. Other metrics, such as a standard deviation of the data values may be used to examine the data values. From these statistics, an initial range of values (pixel intensities) is calculated that will be considered part of the tubular structure.

The range may be constrained so that it will initially be very small with respect to the full range of the data in order to reduce errors where a vessel is near another structure of potentially overlapping pixel intensities, such as bones, the base of the skull, etc. As described below, this enables the methods of the present disclosure to track a centerline that is parallel or adjacent to a bony structure (e.g., the carotid siphon). In addition, a smaller range of values will help ensure that if the process does not succeed, it fails quickly. Throughout the process described below, the range may be expanded or limited, as necessary.

At S310, the flow enters an iterative loop that executes so long as the range has changed less than a configurable number of times (see, below). The process attempts to generate two discrete curves, represented as Non-Uniform Rational B-Spline (NURBS) curves that start at the two input points and join at some position within the volume. The two curves are used to increase the likelihood of finding a curve that connects the two points when there are bifurcations, trifurations, or more complex branches. For example, if one of the curves goes down a wrong branch, then the curve starting at the other point will join at the point where the first curve branches. In yet other circumstances, the curves may not join indicating that both curves may have traveled down different branches of the tubular structure.

At S312, for each range, the curves are initialized to start at the input points, i.e., one from the first point and one from the second point. At S314, the initial direction vector for each curve is towards the other input point. Using the initial point and direction, a plane is defined in the volume perpendicular to the direction and passing through the point (a current point). This plane describes a cross section of the tubular structure. In order to choose the next point to add to the curve, the direction is perturbed slightly in several directions. For example, the direction may be perturbed in, e.g., sixteen directions. Each of the perturbed directions results in another cross section. For each of these cross sections the area of the tubular structure is measured. The area is measured based on the requirement that values be connected and within the current range. The direction normal to the cross section with the smallest area is chosen as the direction to move.

At S315, a local search may be performed to determine and move to a pixel having a highest intensity. For example, in the case of magnetic resonance (MR) data where the vessel is narrow, it is likely that the pixel with the highest intensity value in the local region is the center of the vessel. To account for instances where a path defined by the above process is not passing through that pixel, the local search looks for a pixel having a more intense value. The locality of the search may be limited to 2 minimum spacing units from the current point. If a pixel (or pixels) is found having a higher intensity, the path is moved to the pixel having the highest intensity.

At S316, it is determined if the curves have terminated. This may be tested by determining if the intensity value at this new position is not within the current range, if so, the curve is terminated. For example, if the intensity at the new position was greater, it is possible that the new position is in bone. If at S316 the curves have not terminated, then the intensity value at this position is within the current range. As such, the point is added to the curve. The curves are then tested at S320 to see if they have joined. If the curves are not joined, the process of measuring the smallest cross sectional area to determine the next direction at S314 is repeated using the new position and direction.

If the curves are joined at S320, it is possible that the resulting curve may not follow the center of the tubular structure; rather it may follow a tortuous path inside the tubular structure. To alleviate this condition, the result may be cached at S324 (passing through S322 in a first loop), and the range increased at S318 to run the process again (S310-220). The amount that the range is increased depends on the initial range, the full range of the values in the dataset, how much the range was increased the last time the range was increased, etc. As will be shown in FIGS. 4A-4D and 5A-5D, changing the range enables the process of FIG. 3 to take advantage of the principal that a curve following the center of a tubular structure is guaranteed to be shorter than one that follows a tortuous path inside the tubular structure. Thus, after running through the process S310-S320 a subsequent time, if the result of the process is better at S322, then the result may cached at S324, and so on. A "better" result is when the length of the curve is shorter than the length of the curve as determined in the previous pass through the loop. The process continues until it fails to find a curve connecting the two points, or the resulting curve is longer than a previous result, which likely means the range has become too large (S330).

Returning back to S316, if both curves are terminated, the process flows to S318, where the range is increased and the curves are reinitialized to start over at S310. At S310, it is determined if the range is no longer okay, then it is determined if there is a result at S326. The test at S310 determines if the range has grown to greater than five times the initial range or if more than 20 iterations of the loop have been performed. If so, then the process will halt with a failure at S328. If there is a result, then the process halts with a success at S330.

Thus, to summarize the operational flow of FIG. 3, an optimal result may be found when the curve connecting the two points is along the shortest path length constrained by the smallest range used to determine cross sectional areas. It is noted that sampling associated with the processes herein may be performed using trilinear interpolation.

Figure 4A:
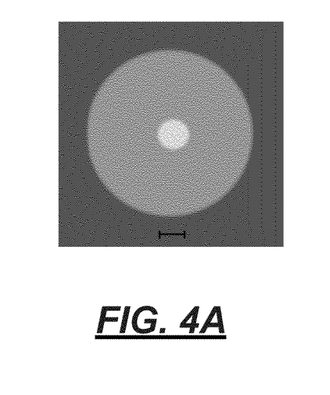
FIGS. 4A-4D illustrate a cross section of the tubular structure and varying data ranges of cross sectional areas from small to large.
Figure 4B:
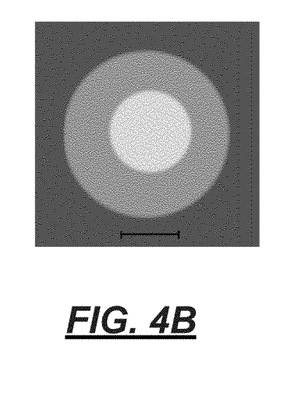
Figure 4C:
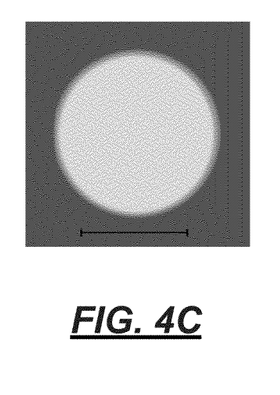
Figure 4D:
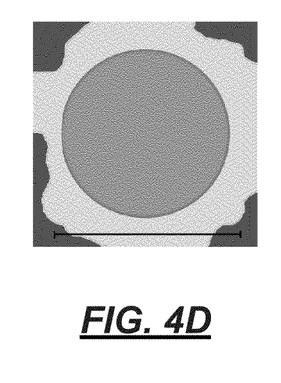
Figure 5A:
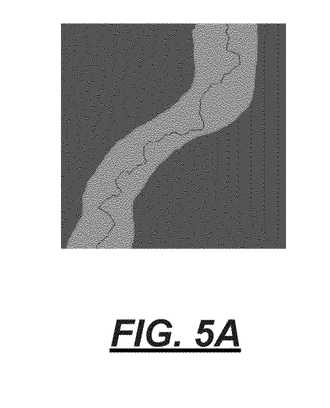
FIGS. 5A-5D illustrate a resulting centerline derived from the associated data range.
Figure 5B:
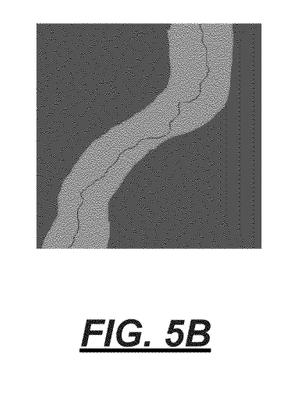
Figure 5C:
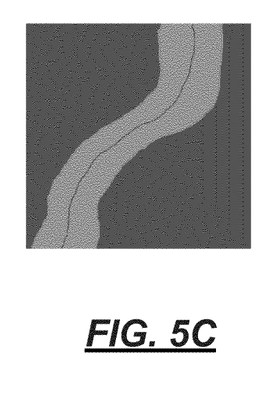
Figure 5D:
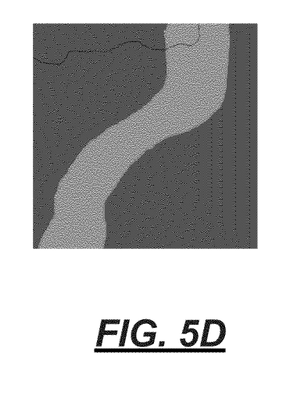

FIGS. 4A-4D and 5A-5D show the effect of the changing ranges for cross sections and the resulting centerlines, respectively, to demonstrate the iterative flow of FIG. 3. As shown in FIGS. 4A and 5A, selecting a small range will often fail to find a complete centerline, as it typically results in a highly tortuous curve travelling inside the tubular structure. As the range increases (FIGS. 4B and 4C), the centerline becomes smoother (FIGS. 5B and 5C) and passes through the true center of the tubular structure (FIG. 5C). Once the range is too large (FIG. 4D) either a centerline will not be found or the length of the result will start to increase (see, FIG. 5D).

Once the centerline of a vessel is determined, contouring may be performed by taking cross-sections of the vessel at regular intervals. With the cross-sections, the edge of the tubular structure may be determined. Finding high quality contours that outline a tubular structure from a collection of cross sections may be problematic, as tubular structures may not exhibit a large gradient magnitude at their borders. In addition, tubular structures may contain bifurcations, trifurcations, or more complex branch structures that make finding high quality contours difficult. In using the results from contouring, it is possible that the contour produced at a branching of the vessel may be identified as a false positive for an aneurysm or stenosis, or may otherwise obscure important details.

Figure 6:
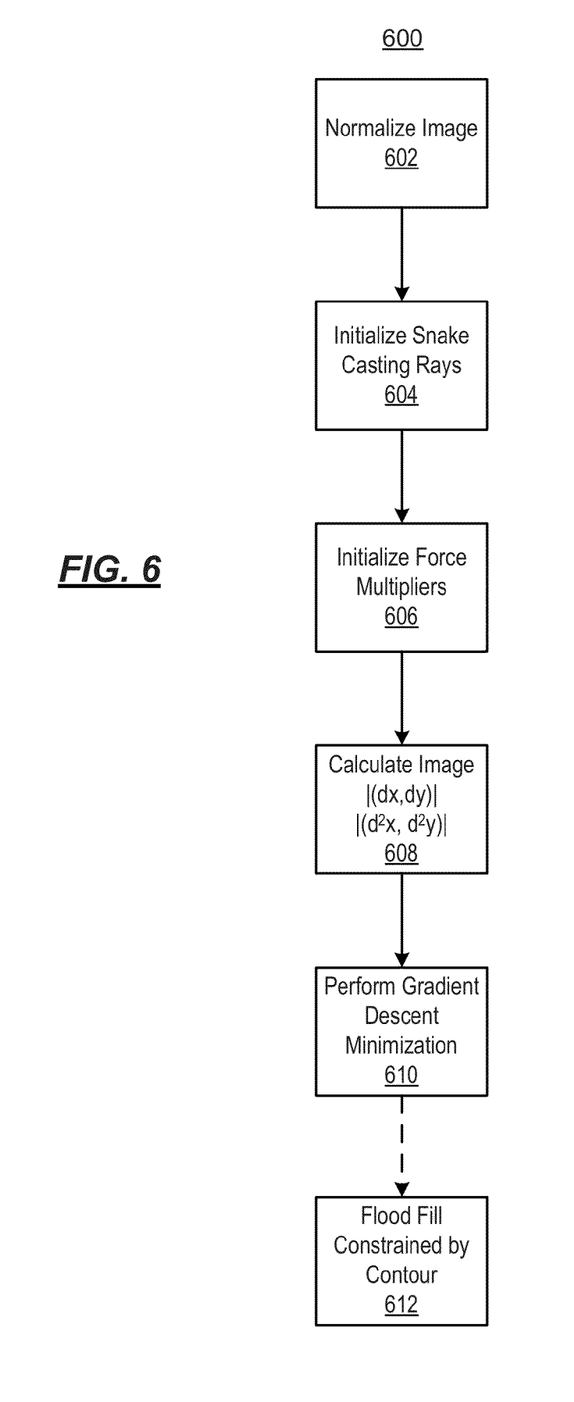
FIG. 6 illustrates an operational flow diagram of processes performed to generate a contour of the tubular structure.

FIG. 6 illustrates an operational flow diagram 600 to generate a contour of the tubular structure using an active contour model. The tubular structure may be a vessel, as noted above. The active contour model attempts to minimise energy associated with a contour as a sum of the internal and external energies beginning at a starting point. The starting point may be user selected or automatically provided to the model.

In the active contour model, a "snake" is a set of points. The snake may be visualized as a rubber band of arbitrary shape that is deforming over time to get as close as possible to the object contour. Snakes depend on other mechanisms to solve the problem of finding contours, such as interaction with a user, or information from image data adjacent in time or space to points of interest. As understood by those of ordinary skill in the art, a snake is an energy minimizing, deformable spline influenced by constraint and image forces that pull it toward object contours. A snake is initialized near the target about the selected point, and is iteratively refined such that it is attracted toward the salient contour. The snake in the image can be represented as a set of n points:

$$v_i = (x_i, y_i)$$

where i=0 . . . n−1

The energy function, which is made up of internal and external forces may be defined as:

$$E^*_{snake} = \int_0^1 E_{snake}(v(s))ds = \int_0^1 (E_{internal}(v(s)) + E_{image}(v(s)) + E_{con}(v(s)))ds$$

The external energy may be defined as $E_{external} = E_{image} + E_{con}$, where $E_{image}$ denotes the image forces acting on spline, and $E_{con}$ serves as external constraint forces introduced by user. The internal energy of the snake is $E_{internal} = E_{cont} + E_{curv}$, where $E_{cont}$ denotes the energy of the snake contour and $E_{curv}$ denotes the energy of the spline curvature.

The internal energy may be defined as:

$$E_{internal} = (\alpha(s)|v_s(s)|^2 + \beta(s)|v_{ss}(s)|^2)/2$$

$$= \left(\alpha(s)\left\|\frac{d\bar{v}}{ds}(s)\right\|^2 + \beta(s)\left\|\frac{d^2\bar{v}}{ds^2}(s)\right\|^2\right)/2$$

The internal forces associated with the internal energy are represented by the magnitudes of the first and second derivatives of the curves. The internal forces may be defined as:

$$\nabla E_{internal}(s) = \nabla[(\alpha(s)\|v_s(s)\|^2 + \beta(s)\|v_{ss}(s)\|^2)/2]$$

$$\nabla E_{internal}(s) = \left[\left(\alpha(s)\nabla\left\|\frac{d\bar{v}}{ds}(s)\right\|^2 + \beta(s)\nabla\left\|\frac{d^2\bar{v}}{ds^2}(s)\right\|^2\right)/2\right]$$

$$= \alpha\frac{\partial^2 \bar{v}}{\partial s^2} + \beta\frac{\partial^4 \bar{v}}{\partial s^2}$$

The external forces are derived from the image itself, and are dependent on what is being looked at in the image. For example, if the edges or boundaries of a vessel are of interest, an edge functional force may be used. The edge functional force is based on the magnitude of the first derivative of intensity values of the image, and may be defined as follows:

$$E_{edge} = -|\nabla I(x,y)|^2$$

In accordance with the result of the edge functional force, points in the image may be moved to locations such that a minimum value for energy is obtained. As will be described below, an external force based on a second derivative of the image intensities at points in the image is determined in accordance with the following:

$$-|\nabla|\nabla I(x,y)|^2|^2$$

In some implementations, the internal energy forces may be defined using $C^1$ and $C^2$ continuity. $C^1$ continuity is the continuity of the tangent vector of a curve, where $C^2$ continuity is the continuity of the acceleration vector associated with a curve. The stronger the internal forces, the more stiff the curve will be (i.e., it will have less kinks or bends). The stronger the edge functional force, the more likely a point will be trapped in a local minima (i.e., where a gradient magnitude is relatively high). Thus, the selection of the starting point will affect the results of the calculations.

In some implementations, a balloon snake maybe used, wherein the balloon is initially within the vessel walls. A balloon snake is a snake that behaves like a balloon which is blown up. When it passes by edges, it is stopped if the contour is strong or passes through if the contour if the contour is too weak. Balloon forces are applied to make the snake grow. When the gradient magnitude is significant enough to prevent the balloon forces from expanding further, then it will ultimately converge there.

With the above introduction, the operational flow diagram 600 of FIG. 6 will now be described. At S602, the image is normalized. Normalizing the image data changes the range of pixel intensity values such that they are within a predetermined range. From the normalized data, a starting point is provided where the energy is minimized. This may be provided by a user input or automatically, as noted above. For example, a center of the image may be used as a starting point based on an assumption that the vessel or tubular structure is centered within the image. If that is the case, from the center of the image, a middle twenty-five pixel values are averaged to be used to normalize the image pixel intensities. Other numbers of pixel values may be used. Averaging of the middle pixel values reduces the likelihood of an abnormally high or low pixel value from being used in the normalization process. Using the average value, the entire image is normalized by dividing the pixel values by the average value.

At S604, snake casting rays are initialized. The snake may be initialized as circle having, e.g., thirty-two points at a radius of one pixel. Other numbers of points may be used. Rays may be cast from the middle through each of the points and outward into the image to search for a pixel along the ray having a change in intensity of at least 10% (e.g., 0.1 greater or less than the middle value). When such a point is found along a particular ray, the initial point of that ray is moved from the circle radius to the new point where the intensity change was found. When such a point is found for all points, the snake is initialized at those points (i.e., the snake is initialized as a closed curve encompassing the, e.g., thirty-two points). Ray casting at S604 addresses dependencies that snakes have on external mechanisms in finding contours.

At S606, the force multipliers are initialized. In particular, a balloon force may be set such that it converges at that a predetermined radius. This selection is based on a principal that if there are no external forces acting on the balloon snake, then for a selected magnitude of the balloon force, the balloon will converge at a specific radius. In implementations using the balloon snake, the constants chosen to define the balloon force has an opposite effect on the continuity forces $C^1$ and $C^2$. For example, if $C^1$ and $C^2$ are 0.05, the balloon force to converge at a radius of five may be 0.8. The relationship follows a linear correlation. As such, various combinations of the balloon force and the $C^1$ and $C^2$ continuity forces may be selected in accordance with a desired radius of convergence.

In some implementations, the magnitude of the balloon force may be set such that it converges at radius that is an average distance of the points determined at S604 where intensity changes were located. The average distance may be computed from an area defined by the points, where the area that is assumed to be substantially circular.

At S608, the image forces are calculated. For example, the magnitudes of the first and second derivatives of the image intensities at points in the image may be determined. In some implementations, where a vessel is small, an external force based on the second derivative of the image intensities may be used. This serves to push the contour out such that it lies just outside the vessel wall.

The results from S608 may be used at S610, where a gradient descent minimization is performed. Gradient-descent minimization is an optimization which can be used to minimize snake energy. For example, the minimization may be performed by taking the second and fourth derivatives of the curve itself for the internal forces, and taking the second derivative of the intensity of the image.

Generally, gradient-descent minimization may be implemented as:

$$x_{t+1} = x_t + \gamma \frac{df}{dx}(x_t) \text{ and } y_{t+1} = y_t + \gamma \frac{df}{dy}(y_t)$$

where $\gamma$ controls the size of the step at each iteration. A vector representation of the above is: $x_{t+1} = x_t + \gamma \nabla f(x_t)$.

The energy function of the snake may be approximated by using the discrete points on the snake.

$$E^*_{snake} \approx \sum_1^n E_{snake}(\overline{v}_i)$$

The derivative of above sum is the sum of derivatives.

$$\nabla E^*_{snake} \approx \sum_1^n E_{snake}(\overline{v}_i)$$

The points vector $v_i$ may be iteratively adjusted by using gradient descent minimization.

$$\overline{v}_i \leftarrow \overline{v}_i - \nabla E_{snake}(\overline{v}_i)$$

Applying the derivative to energy function gives:

$$\nabla E_{snake}(\overline{v}_i) = w_{internal} \nabla E_{internal}(\overline{v}_i) + w_{external} \nabla E_{external}(\overline{v}_i)$$

The above can be approximated using finite differences, i.e., the second derivative with respect to s can be calculated using three adjacent points on the snake, and the fourth derivative with respect to s can be calculated using five adjacent points. Thus, the final equations are:

$$\overline{v}_i = \leftarrow \overline{v}_i - \gamma \left\{ w_{internal} \left[ \alpha \frac{\partial^2 \overline{v}}{\partial s^2}(\overline{v}_i) + \beta \frac{\partial^4 \overline{v}}{\partial s^4}(\overline{v}_i) \right] + \nabla E_{ext}(\overline{v}_i) \right\}$$

$$\overline{x}_i = \leftarrow x_i - \gamma \left\{ w_{internal} \left[ \alpha \frac{\partial^2 x}{\partial s^2}(\overline{v}_i) + \beta \frac{\partial^4 x}{\partial s^4}(\overline{v}_i) \right] + \frac{\partial}{\partial x} \nabla E_{ext}(\overline{v}_i) \right\}$$

$$\overline{y}_i = \leftarrow y_i - \gamma \left\{ w_{internal} \left[ \alpha \frac{\partial^2 y}{\partial s^2}(\overline{v}_i) + \beta \frac{\partial^4 y}{\partial s^4}(\overline{v}_i) \right] + \frac{\partial}{\partial y} \nabla E_{ext}(\overline{v}_i) \right\}$$

As described above, the process at S610 is performed iteratively. Iterations may be performed until the $\Delta_{area}$ is less than 0.001 pixel or until some maximum number of iterations is reached (e.g., 1000), after which the minimization is stopped, wherein the snake substantially approximates the contour of the vessel of interest.

Optionally, at S612, a flood fill is performed that is constrained by the contour. This may be used where the image data is CT data. Where the image data is MR data, the snake may be used directly to determine the contour. With CT data, the snake constrains the flood fill, which is done to exclude calcifications that appear in the data. Among other things, the constraint prevents the contour from being pulled into neighboring bone.

The aforementioned operational flow 600 provides improved results when there is low contrast between the edge of the vessel and the surrounding tissue. In addition, the flow 600 will determine a contour around a branch, where conventional methods would flood fill info the branch.

Figure 7A:
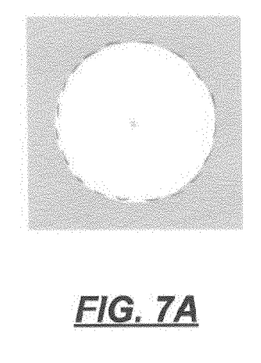
FIGS. 7A-7D illustrate various cross sectional views of a tubular structure, such as that shown in FIG. 2.
Figure 7B:
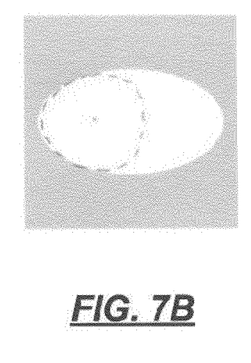
Figure 7C:
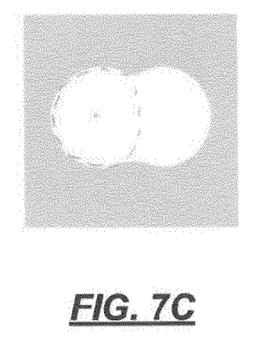
Figure 7D:
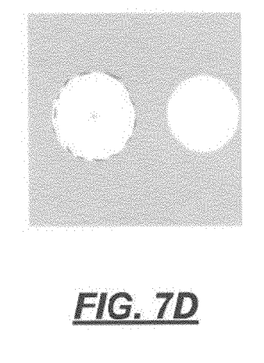

In accordance with implementations of the present disclosure, branches and bifurcations may be detected. The first property used to detect a branch is curvature. Normally with a tubular structure the curvature of the cross section contour will not change sign. Typically, a vessel has a positive curvature. If the sign of the curvature changes, that will often indicate a potential branch. This is shown in FIG. 7C, which has a cross section with negative curvature. The next property used to detect branches is the change in circularity. A tubular structure will not normally have sudden changes in circularity. When a significant change in circularity occurs that can also indicate a potential branch, FIG. 7B demonstrates this, note the location of the centerline. The other property that may be measured to detect branches is the change in area inside the contour. A sudden change in the area inside a contour can also indicate a potential branch. FIG. 7D shows a branch completing, the area inside the contour around where the centerline lies will have changed significantly. Often when these measurements indicate a branch, multiple consecutive cross section contours are identified as potential branches. Combinations of the above properties may be used to identify a bifurcation.

Figure 8:
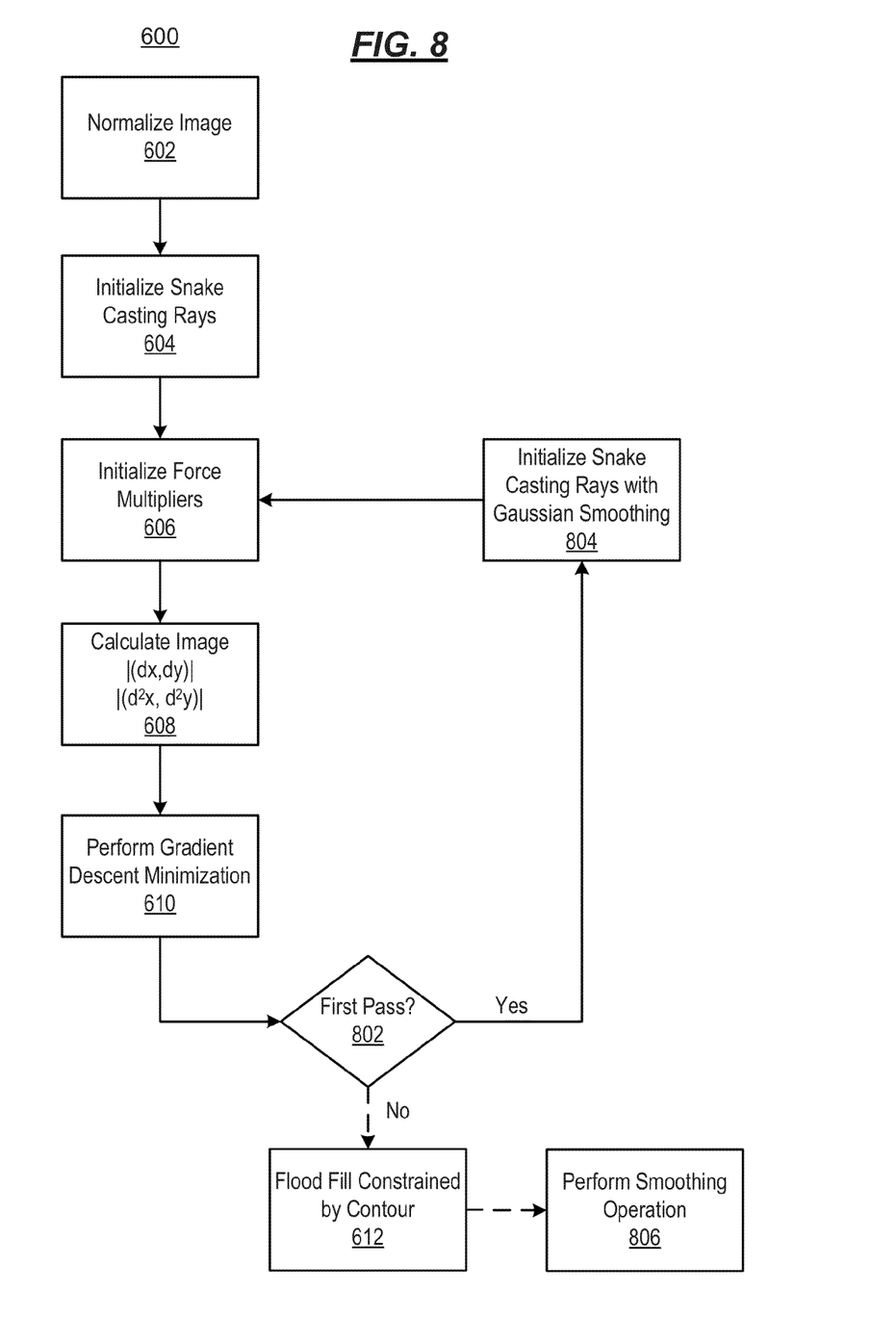
FIG. 8 illustrates another operational flow diagram of processes performed to generate a contour of the tubular structure.

FIG. 8 illustrates another operational flow diagram 800 of processes performed to generate a contour of the tubular structure. As noted above, the tubular structure may be a vessel. The operational flow 800 addresses situations that may occur in the operation flow 600 where the snake over constrains the flood fill for CT on some contours. In particular, the operational flow 800 addresses situations where the snake in of the operational flow 600 gets stuck in a local minima. The operational flow 800 may also be performed automatically regardless of whether such situations arise.

To address this situation, the operational flow 800 begins with the operations at S602-S610, as described above with regard to FIG. 6. The operations at S602-S610 may be a first pass to determine the contour of the vessel of interest. Next, at S802, it is determined if this is a first pass through the operational flow 800. If so, then a second pass through all the contours may be made beginning with a change on how the snake is initialized. For example, a smoothing operation may be performed on all points of the contour at S804 to "push" the snake past the local minima in which it is stuck so that the operation flow 800 can find the correct contour.

For example, the initialization may be based on e.g., a 50/50 mix of the ray casting initialization performed at S604 and a contour that is passed into the algorithm. The contour that is passed is determined by taking the results of the first pass at S610 and performing a Gaussian smoothing operation on the contours. This smoothing is performed at each point of a contour by using kernel coefficients to blend the adjacent surrounding contours with the contour being smoothed. In some implementations, a previous two contours and a next two contours may be used with respect to the point on the current contour. These may be mixed together to arrive at a new result for the point at the current contour. In some implementations, the results of the first pass may be used in the initialization process at S804.

After the initialization at S804, the operations at S606-S610 are performed a second time using the results of the initialization at S804. The flow again returns to S802, where it is determined that this is not the first pass. As such, the optional flood fill at S612 may be performed. If the flood fill operation is performed, there may be some poor contours. The quality may be determined in accordance with the properties for branch and bifurcation detection note above. In an optional operation at S806, to fix the quality of such poor contours, the same Gaussian smoothing operation (across contours) may be performed after the flood fill for local smoothing.

Figure 9A:
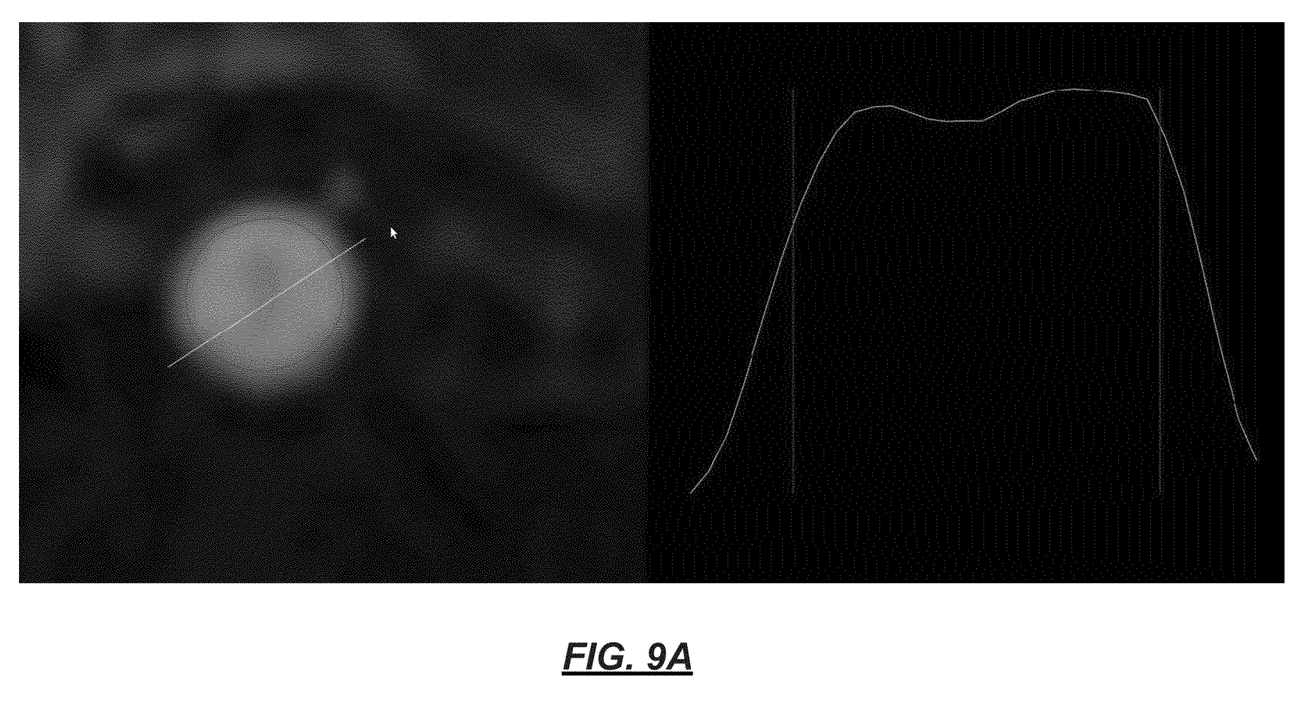
FIG. 9A illustrates a contour of a vessel having a "halo" effect in an image and a plot of image intensities.
Figure 9B:
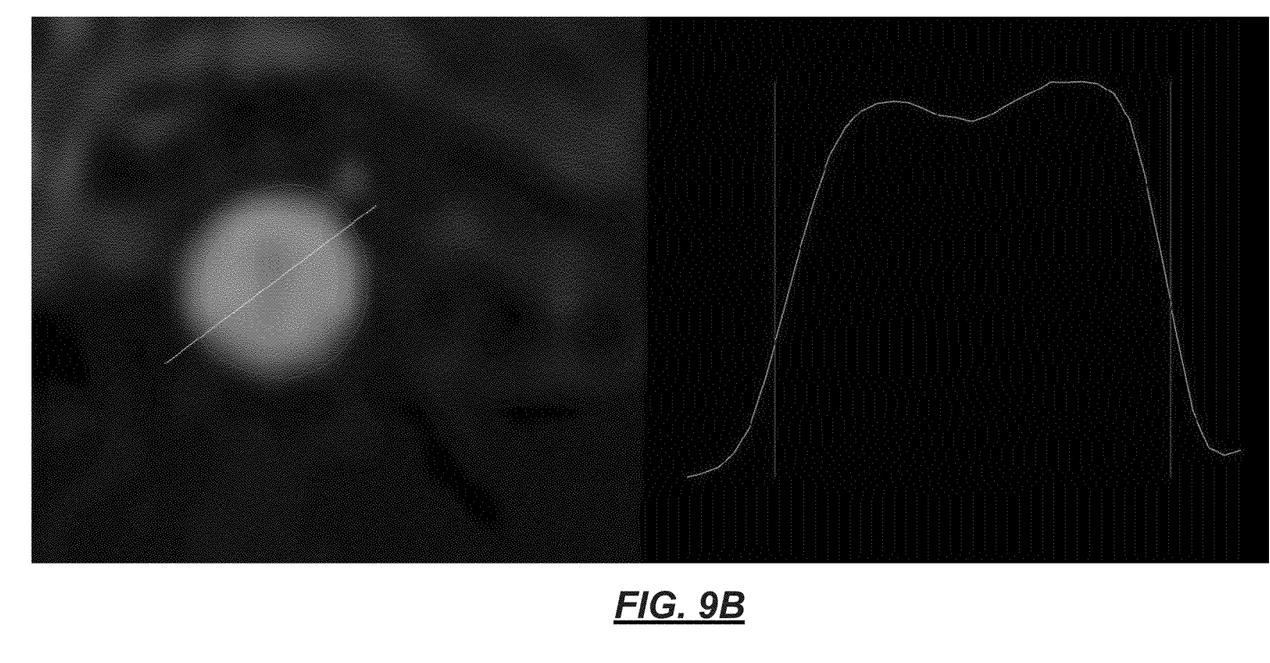
FIG. 9B illustrates a correction to contour of the vessel of FIG. 9A.

With reference to FIG. 9A, in some cases a snake result may exhibit a 'halo' effect in an MR image. FIG. 9A also illustrates a plot of the image intensities (vertical axis) along the yellow line segment intersecting the contour. The red vertical line segments represent the intersection points of the contour with the yellow line segment. The halo effect can happen where the magnitude of the gradient is greatest at a point inside the tubular object. To alleviate this, the process of FIG. 8 may include another step after step 802 and before step S612 where the snake is pushed slightly outwards and then a flood fill is used to find a new contour using thresholds calculated from intensities inside the original snake. For example, the snake may be pushed out the lesser of half the current radius or five pixels. After applying the optional step to push out the snake, the resulting contour may look like that in FIG. 9B. The above method may be used for any image that exhibits a halo effect, with MR being exemplified.

A workflow associated with a user interface will now be introduced with reference to FIGS. 10-13. Generally, a user may instantiate the user interface on a workstation, such as that described above. The user interface provides options to select, edit, analyze, and generate reports regarding vessels within image data associated with, e.g., a patient. A user may initially select a particular vessel or vessels of interest to be displayed in a four quadrant view that shows, e.g., a 3D view of an area of interest and associated orthogonal 2D views of the same area of interest. Once the vessel selected, the user may edit particular properties of the vessel, such as the centerline, which may have been automatically generated in accordance with the methods above.

Figure 10:
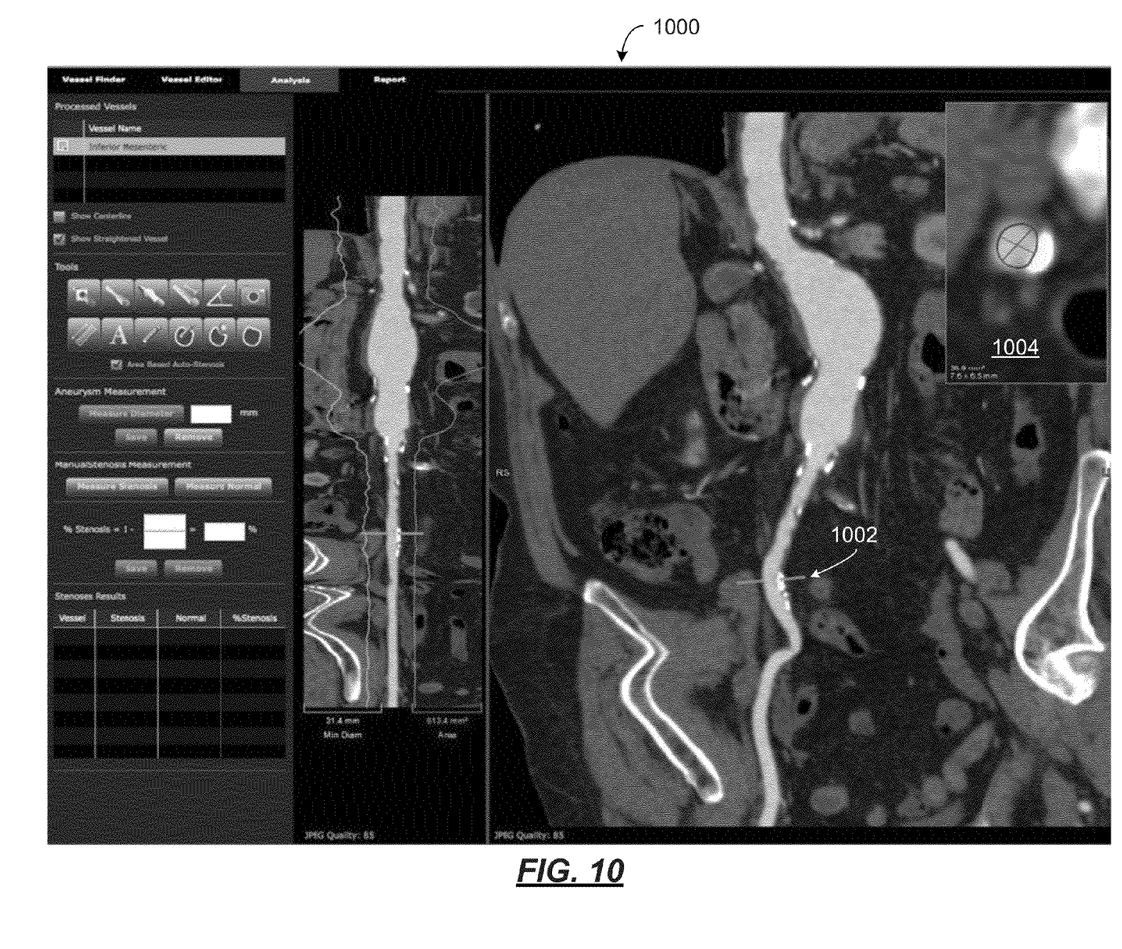
FIGS. 10-12 illustrate example user interfaces that are operative to provide a workflow for vessel selection, editing, analysis and reporting.
Figure 11:
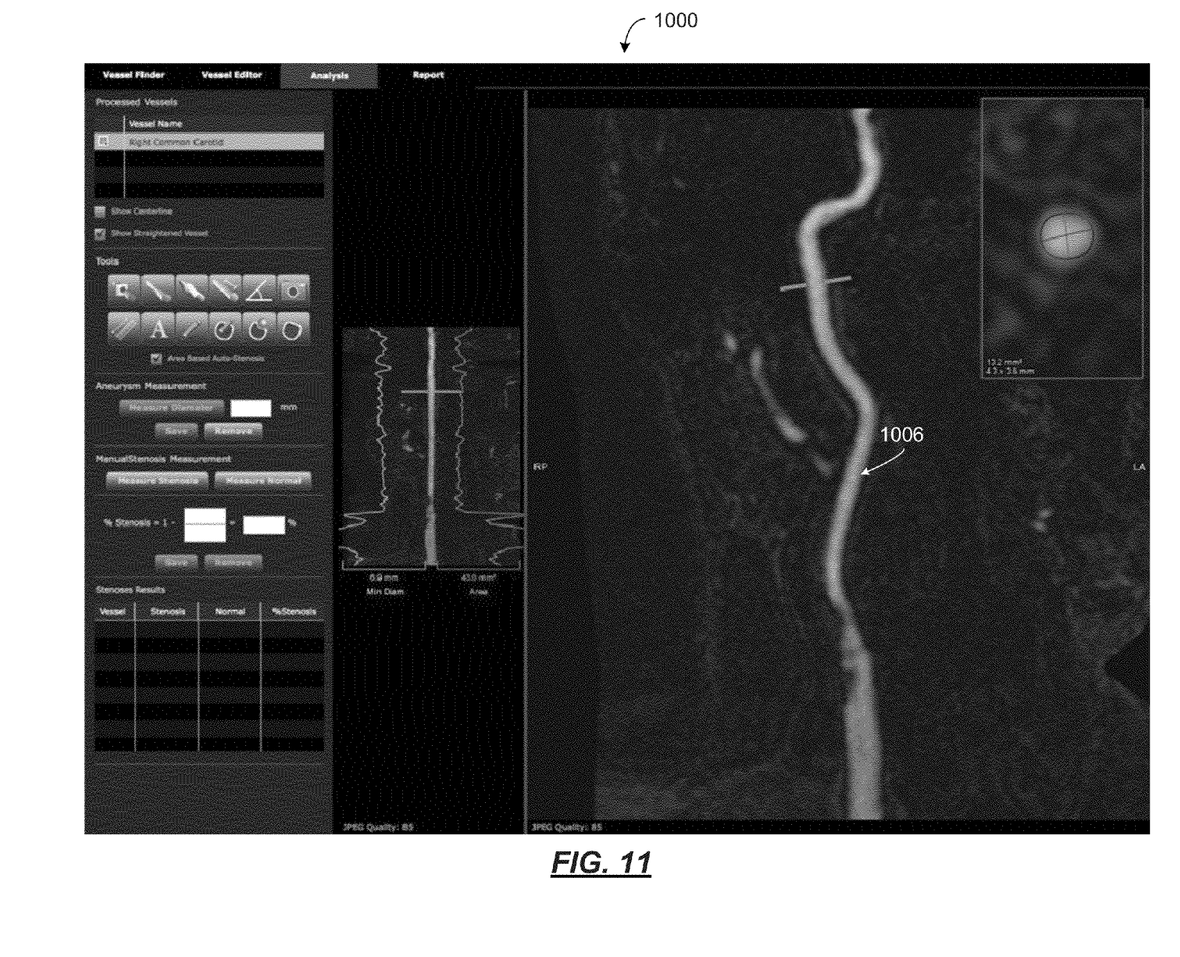
Figure 12:
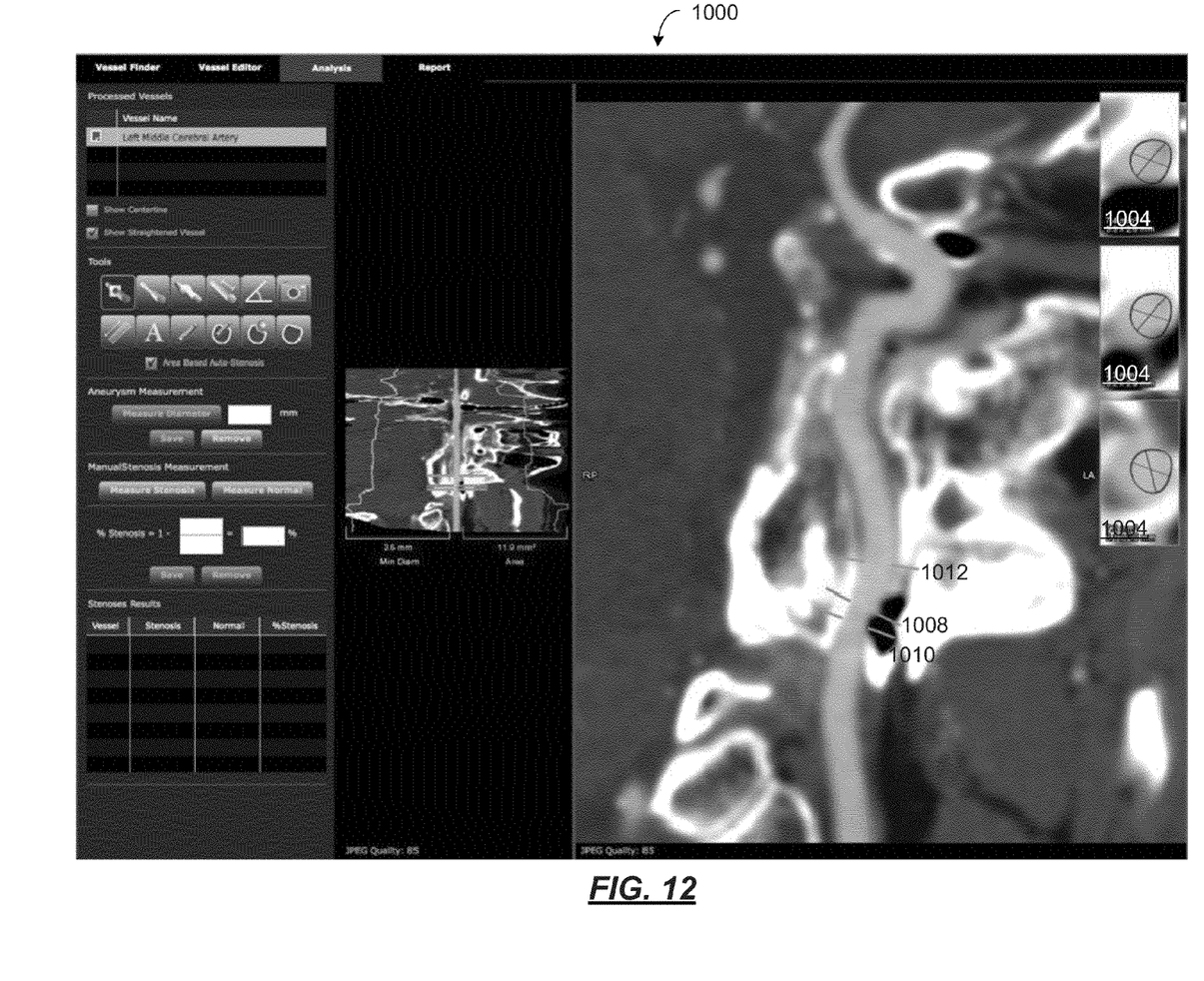

Once the user is satisfied with the vessel, user may enter an analysis view. In this view, a vessel contour may be shown. Within the analysis view, user may select various functions to determine characteristics of the vessel under analysis. For example the user may determine areas of stenosis or aneurysms present in the vessel either manually or automatically by selecting an appropriate tool. The user may also edit contours associated with the vessel of interest. Other data may be displayed, such as cross-sections, diameters, areas, etc. When the user has completed the analysis of the vessel, a report may be generated to provide information in a condensed format for review by, e.g., a healthcare professional. With the introduction above, the specifics of each mode of operation, as presented in the user interface, will now be introduced.

Referring now to FIGS. 10-12, there are screen shots of a user interface 1000 that may be presented on, e.g., the user workstation 22 to view image data acquired by the image processing system 16. FIG. 10 illustrates computed tomography (CT) contrast imagery. The area indicated with a marker 1002 is right iliac vessel adjacent calcification, and shown in cross section in a window 1004. In accordance with the user Interface 1000 shown, calcification is excluded, as described above.

FIG. 11 illustrates a user interface 1000 showing magnetic resonance (MR) imagery of the carotid artery 1006.

FIG. 12 illustrates a user interface 1000 showing imagery of a CT contrast angiogram of the left middle cerebral artery adjacent to bone. In some implementations, regions of imagery that exhibit large fluctuations in pixel intensity may be interpolated between adjacent contour sections. In this user interface of FIG. 12, the section indicated by marker 1008 is interpolated between the markers 1010 and 1012. The interpolated section provides a user, such as a physician, with a rough area for fine tuning with an editor (e.g., puck editor) using one of the windows 1004 displaying the cross section. It is noted that in some implementations, the markers 1010 and 1012 may not be provided, rather the user interface may display only the marker 1008.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for applying an active contour model to a vessel analysis using a processor of a computing device, comprising:
   receiving, at a computing device, image data representative of an image of at least one vessel;
   normalizing the image data about a starting point by averaging pixel intensities of plural pixels about the starting point to determine an average pixel intensity, and dividing the pixel intensities of the image data by the average pixel intensity;
   initializing a snake a first time, the snake defining a set of points that represent a spline within the vessel;

calculating image forces that act on the snake to pull the snake toward a contour of the vessel; and iteratively applying a minimization process to determine the contour of the vessel.

2. The method of claim 1, wherein the starting point is a center of the image.

3. The method claim 1, initializing the snake the first time further comprising:

casting rays from the starting point through plural initial points arranged about the starting point at a predetermined radius;

determining a point along each ray where a pixel intensity differs from the starting point by a predetermine intensity;

moving each initial point to a new point at the point along its associated ray where the pixel intensity differs by the predetermined intensity; and initializing the snake at the new points.

4. The method of claim 1, further comprising initializing force multipliers such that a force of the snake converges at a radius that is an average distance of the new points.

5. The method of claim 1, wherein calculating image forces comprises determining magnitudes of first and second derivatives of image intensities at points in the image, and wherein an external force based on the second derivative of the image intensities is used to push the contour out such that it lies just outside a vessel wall.

6. The method of claim 1, wherein the minimization process is a gradient descent minimization.

7. The method of claim 1, further comprising performing a second initialization of the snake in accordance with the initialization of the snake the first time and a contour on which on a Gaussian smoothing operation is performed using contours that result from iteratively applying the minimization process.

8. The method of claim 7, wherein the second initialization of the snake is based on a 50/50 mix of results of initializing the snake the first time and the contour on which on the Gaussian smoothing operation is performed.

9. The method of claim 7, wherein a previous two contours and a next two contours are used with respect to a point being smoothed on the contour to determine kernel coefficients.

10. The method of claim 1, further comprising:

determining the presence of a halo effect surrounding the contour of the vessel;

pushing the snake out a predetermined number of pixels; and performing a flood fill operation constrained by the contour.

11. The method of claim 1, further comprising determining bifurcations in the vessel.

12. A method for applying an active contour model to a vessel analysis using a processor of a computing device, comprising:

receiving, at a computing device, image data representative of an image of at least one vessel;

initializing a snake a first time, the snake defining a set of points that represent a spline within the vessel;

normalizing the image data about a starting point;

averaging pixel intensities of plural pixels about the starting point to determine an average pixel intensity;

dividing the pixel intensities of the image data by the average pixel intensity;

calculating image forces that act on the snake to pull the snake toward a contour of the vessel, the image forces being determined from magnitudes of first and second derivatives of image intensities at points in the image;

iteratively applying a minimization process to determine the contour of the vessel; and applying a Gaussian smoothing operation using the contour from the iteratively applying the minimization process.

13. The method claim 12, initializing the snake the first time further comprising:

casting rays from the starting point through plural initial points arranged about the starting point at a predetermined radius;

determining a point along each ray where a pixel intensity differs from the starting point by a predetermine intensity;

moving each initial point to a new point at the point along its associated ray where the pixel intensity differs by the predetermined intensity; and initializing the snake at the new points.

14. The method of claim 12, further comprising initializing force multipliers such that a force of the snake converges at a radius that is an average distance of the new points, and wherein the average distance is determined from an area defined by the new points.

15. The method of claim 12, wherein an external force based on the second derivative of the image intensities is used to push the contour out such that it lies just outside a vessel wall.

16. A tangible computer readable medium having stored thereon computer executable instructions that when executed by a processor of a computing device cause the computing device to:

receive image data representative of an image of at least one vessel;

initialize a snake a first time, the snake defining a set of points that represent a spline within the vessel;

normalize the image data about a starting point;

average pixel intensities of plural pixels about the starting point to determine an average pixel intensity;

divide the pixel intensities of the image data by the average pixel intensity;

calculate image forces that act on the snake to pull the snake toward a contour of the vessel; and iteratively apply a minimization process to determine the contour of the vessel.

17. The tangible computer readable medium of claim 16, further comprising instructions to cause the computing device to:

caste rays from the starting point through plural initial points arranged about the starting point at a predetermined radius;

determine a point along each ray where a pixel intensity differs from the starting point by a predetermine intensity;

move each initial point to a new point at the point along its associated ray where the pixel intensity differs by the predetermined intensity; and initialize the snake at the new points.

18. The tangible computer readable medium of claim 16, further comprising instructions to cause the computing device to perform a second initialization of the snake in accordance with the initialization of the snake the first time and a contour on which on a Gaussian smoothing operation is performed use contours that result from iteratively applying the minimization process.

* * * * *